Dec. 13, 1955   S. RESSEGUIE   2,726,655
BLOWTORCH ADAPTOR
Filed Nov. 14, 1952
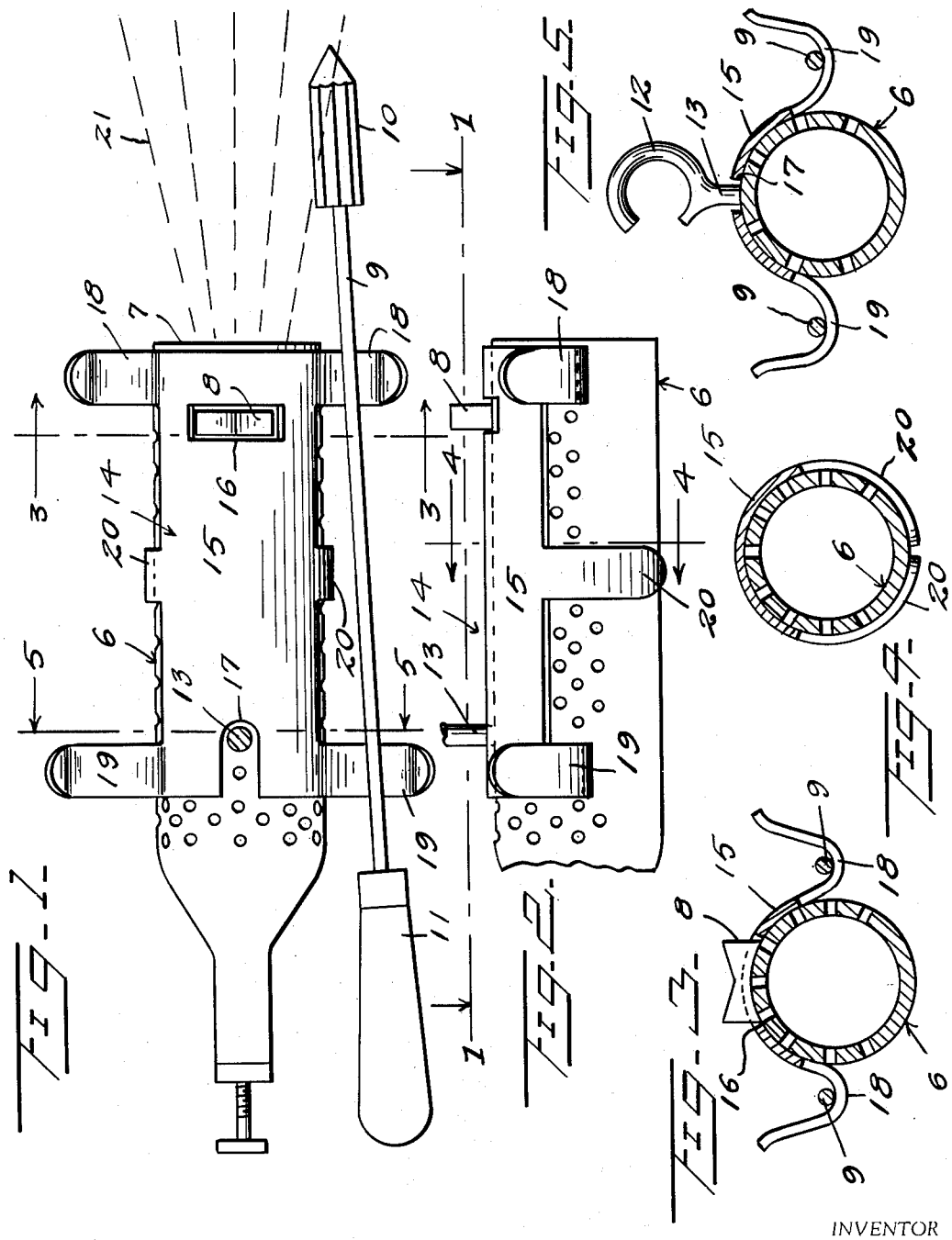
INVENTOR
Stanley Resseguie
BY John N. Randolph
ATTORNEY

United States Patent Office 2,726,655
Patented Dec. 13, 1955

2,726,655

BLOWTORCH ADAPTOR

Stanley Resseguie, Milwaukee, Wis.

Application November 14, 1952, Serial No. 320,587

5 Claims. (Cl. 126—229)

This invention relates to novel adaptors for blowtorches and more particularly to an attachment for the head or burner tube of a conventional blowtorch by means of which a pair of soldering irons may be simultaneously supported and heated by the blowtorch rather than a single soldering iron, as is conventional.

More particularly, it is an object of the present invention to provide an adaptor of extremely simple construction which may be quickly and easily applied to or removed from a conventional blowtorch head without the use of tools and without in any way modifying the structure of the blowtorch head so that the blowtorch may be then utilized for simultaneously heating a plurality of soldering irons, thus greatly increasing the utility of the blowtorch and enabling a single blowtorch to accomplish the function previously requiring two or three blowtorches.

Various other objects and advantages of the invention will hereinafter become more fully apparent from the following description of the drawing, illustrating a presently preferred embodiment thereof, and wherein:

Figure 1 is a horizontal sectional view partly in top plan taken substantially along a plane as indicated by the line 1—1 of Figure 2, showing a conventional blowtorch head or burner tube with the attachment applied thereto;

Figure 2 is a side elevational view of the forward end portion of the burner tube with the attachment in an applied position;

Figure 3 is a cross sectional view taken substantially along a plane as indicated by the line 3—3 of Figure 1;

Figure 4 is a cross sectional view taken substantially along a plane as indicated by the line 4—4 of Figure 2, and Figure 5 is a cross sectional view taken substantially along a plane as indicated by the line 5—5 of Figure 1.

Referring more specifically to the drawing, a conventional blowtorch head or burner tube is illustrated in the drawing and designated generally 6 and is provided with an open forward end 7. The head 6 has a front soldering iron rest 8 mounted on the upper part thereof adjacent its forward end 7 and transversely thereof. The rest 8 defines an upwardly opening V-shaped notch, as best seen in Figure 3, in which a portion of a soldering iron rod 9 located near the head 10 thereof is adapted to rest. The burner tube or blowtorch head 6 has a modified hook or interrupted eye 12 disposed above the rear portion thereof and supported by a stem 13 which is fixed to and rises from the burner tube 6 for supporting the interrupted eye portion 12 above the level of a notch in the front rest 8. The parts 12 and 13 form a rear soldering iron rest adapted to support a part of the soldering iron rod 9 located near the handle 11 thereof. The blowtorch head or burner tube 6 including the front soldering iron rest 8 and the rear soldering iron rest 12, 13 is of conventional construction and the mounting of the soldering iron on said rest has not been illustrated as this is likewise conventional. The rests 8 and 12, 13 support a soldering iron, such as the one disclosed in Figure 1, so that the head 10 thereof is disposed in front of the open discharge end 7 of the burner tube 6.

The blowtorch head adaptor or attachment, designated generally 14 and comprising the invention, is formed from a single strip of metal having an elongated body portion 15 which is transversely bowed from end-to-end thereof to conform to the cross sectional curvature of the head 6 and which is adapted to rest on the upper side of said head. The body portion 15 adjacent a forward end thereof is provided with a transversely elongated opening 16 which fits detachably around the front rest 8, and said body portion 15 is provided with an elongated centrally disposed notch 17 which extends longitudinally thereof and opens outwardly of the opposite, rear end of the body portion 15. The notch 17 loosely receives the stem 13 of the rear rest 12, 13, as best illustrated in Figures 1 and 5.

The body portion 15 at its forward end is provided with corresponding lateral extensions or arms 18 which are reversely curved relatively to the curvature of said body portion 15, so that each arm 18 is curved downwardly and outwardly and thence extends outwardly and upwardly, as best illustrated in Figure 3, to provide a pair of corresponding front side rests. The body portion 15 at its rear end is provided with transversely projecting extensions or arms 19 which are longer than the arms 18, as illustrated in Figures 1 and 5, and which are likewise curved outwardly and downwardly from the side edges of the body portion 15 and terminate in upwardly curved free ends. As seen in Figures 3 and 5, the bottommost portions of the arms 19 are spaced a greater distance from the burner tube 6 than the bottommost portions of the arms 18.

The body portion 15, intermediate of its ends, is provided with integral extensions 20 which project laterally from the side edges thereof and which extend outwardly from the body portion 15 in diverging relationship to one another.

From the foregoing it will be readily apparent that the body portion 15 of the adaptor 14 may be positioned over the burner tube 6 and displaced rearwardly so that the stem 13 will be engaged in the notch 17, after which the forward end of adaptor 14 may be swung downwardly to position the opening 16 around the front rest 8. The two extensions 20 form strap members which may then be bent downwardly and inwardly to engage tightly around a portion of the burner tube 6, as illustrated in Figure 4, for detachably securing the adaptor 14 substantially immovably on the burner tube 6. However, as the description proceeds it will become apparent that the adaptor 14 may be utilized without the anchoring straps 20. With the adaptor 14 applied, as previously described and as illustrated in the drawing, it will be readily apparent that the front and rear side rests 18 and 19 located at each side of the body portion 15 will provide a support for a soldering iron with the front portion of the rod 9 thereof resting in the front side rest 18 and a rear portion of said rod 9 resting in the rear side rest 19. As the rear side rest 19 has its bottommost portion spaced a greater distance from the burner tube 6 than the front side rest 18, the soldering iron rod 9 will be disposed in forwardly converging relationship to the axis of the burner tube so that the soldering iron head 10 will be disposed substantially in front of a portion of the open front end 7 of the burner tube. Thus, the attachment or adaptor 14 will support a pair of soldering irons in the same manner that the single soldering iron in the same manner that the single soldering iron is shown supported in Figure 1 and with the heads 10 of the two soldering irons disposed in the path of the outwardly diverging flame as indicated by broken lines and designated 21 in Figure 1 and which diverges outwardly from the open end 7 of the head. The rod portions 9 of the two soldering irons which are supported by the adaptor 14 are illustrated in Figures 3 and 5 and wherein it will be noted that the rod portions 9 which are supported by the front side rests 18 are disposed nearer the axis of the burner tube 6 than the rod portions which are supported in the rear side rests 19. It will thus be seen that the adaptor or attachment 14 doubles the utility or capacity of the burner tube 6 for accomplishing its intended result of soldering iron heating. Furthermore, application of the adaptor 14 does not impair the utility of the conventional front rest 8 and rear rest 12, 13, so that a third soldering iron may be supported in a conventional manner by these parts for simultaneously heating the heads of three soldering irons.

Since the opening 16 and notch 17 when engaged around the front rest 8 and stem 13, as illustrated in Figure 1, will allow the adaptor 14 to move only slightly laterally, it will be readily apparent that the adaptor could function without the anchoring straps 20 which, however, secure the adaptor more rigidly in place and are capable of being readily bent outwardly for removing the adaptor 14 from the blowtorch head 6. Thus, the adaptor 14 may be readily applied to or removed from the blowtorch head or burner tube for use when it is desirable to simultaneously heat more than one soldering iron.

Various modifications and changes are contemplated and may obviously be resorted to, without departing from the spirit or scope of the invention as hereinafter defined by the appended claims.

I claim as my invention:

1. A device for heating soldering irons comprising, in combination with a substantially horizontally disposed blowtorch burner tube provided with a discharge end and soldering iron rests rising from the burner tube in longitudinally spaced relation to one another including a front rest disposed adjacent said discharge end; an adaptor for use with the burner tube comprising an elongated body member conformably fitting over the upper part of the burner tube and supported thereby and longitudinally thereon, said body member having an opening adjacent one end thereof fitting loosely around the front rest and having a notch extending longitudinally of the body member and opening outwardly at the other end thereof and engaging the other rest for detachably mounting the adaptor on the burner tube, said body member having extensions projecting laterally from at least one longitudinal edge thereof, said extensions being longitudinally spaced relative to one another and having downwardly offset upwardly opening intermediate portions forming front and rear side rests adapted to engage a rod for supporting a soldering iron of which the rod forms a part at one side of the burner tube.

2. A device as is claim 1, said body member having a second pair of extensions projecting laterally from the other longitudinal edge thereof corresponding to the first mentioned extensions and adapted to support a second soldering iron on the other side of the burner tube.

3. A device as in claim 1, said front side rest being located nearer the adjacent longitudinal edge of the body member and nearer the axis of the burner tube than the rear side rest.

4. A device as in claim 1, said body member being transversely bowed and provided with a concave underside having a cross sectional shape corresponding to the cross sectional curvature of the exterior of the upper part of the burner tube on which said body member is supported.

5. A device as in claim 1, and deformable strap members forming integral lateral extensions of an intermediate portion of the body member, said strap members detachably fitting substantially around the sides and bottom of the burner tube for securing the adaptor detachably thereon.

References Cited in the file of this patent

UNITED STATES PATENTS

| Number | Name | Date |
| --- | --- | --- |
| 930,488 | Laurent | Dec. 4, 1894 |
| 955,313 | Bernz | Apr. 19, 1910 |
| 1,432,801 | Streit | Oct. 24, 1922 |
| 2,191,782 | Valane | Feb. 27, 1940 |
| 2,322,753 | Thomas | June 29, 1943 |
| 2,529,164 | Knipe | Nov. 7, 1950 |